United States Patent
Mori et al.

(10) Patent No.: US 8,024,232 B2
(45) Date of Patent: Sep. 20, 2011

(54) RECORDING AND REPRODUCING APPARATUS FOR CONTENT

(75) Inventors: Naoki Mori, Yokohama (JP); Shinya Suenaga, Fujisawa (JP); Akira Tanaka, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 0 days.

(21) Appl. No.: 12/781,042

(22) Filed: May 17, 2010

(65) Prior Publication Data

US 2011/0022495 A1 Jan. 27, 2011

(30) Foreign Application Priority Data

Jul. 24, 2009 (JP) ................................. 2009-172671

(51) Int. Cl.
*G06Q 30/00* (2006.01)
*G06F 17/30* (2006.01)
(52) U.S. Cl. ..................... 705/26.1; 705/27.1
(58) Field of Classification Search ............ 705/26–27.2
See application file for complete search history.

(56) References Cited

U.S. PATENT DOCUMENTS

| | | | |
|---|---|---|---|
| 7,756,793 B2* | 7/2010 | Murase et al. .............. | 705/59 |
| 7,788,271 B2* | 8/2010 | Soma et al. ................. | 707/758 |
| 7,802,200 B1* | 9/2010 | Siegel et al. ................. | 715/811 |
| 2005/0146966 A1 | 7/2005 | Kawamura | |
| 2008/0010136 A1* | 1/2008 | Yu .................................. | 705/14 |
| 2009/0049464 A1* | 2/2009 | Kang .............................. | 725/1 |
| 2009/0132545 A1* | 5/2009 | Kurihara et al. ............ | 707/10 |
| 2009/0276334 A1* | 11/2009 | Hosoda et al. .............. | 705/27 |

FOREIGN PATENT DOCUMENTS

JP 2004-234272 8/2004

OTHER PUBLICATIONS

"Multiple iPods and computers.(PLAYLIST)". Macworld. Mar. 2006. 23, 3, 70(3), 3 pgs [recovered from Dialog on May 19, 2011].*
http://actvila.jp/pdf/ press_20081210.pdf "A world first download distribution service of High Definition video capable of dubbing to a Blu-ray disc is started by Tsutaya TV on acTVila".

* cited by examiner

*Primary Examiner* — Will Allen
*Assistant Examiner* — Kathleen G Davison
(74) *Attorney, Agent, or Firm* — Antonelli, Terry, Stout & Kraus, LLP.

(57) ABSTRACT

A recording and reproducing apparatus for content detects that the same-already purchased content is present when a user newly purchases a content, and determines, based on information in which a user who previously purchases a content sets whether to open the purchase, whether a message to the effect that the content is purchased in duplicate is displayed to the user who newly purchases the content.

6 Claims, 14 Drawing Sheets

FIG.2

USER REGISTRATION

INPUT INFORMATION ON A USER TO BE REGISTERED

| | USER NAME | AGE | MANAGEMENT PASSWORD |
|---|---|---|---|
| MAIN USER | A | 48 | aaaa |
| USER 1 | B | 45 | bbbb |
| USER 2 | C | 21 | cccc |
| USER 3 | | | — |
| USER 4 | | | — |

FIG.4

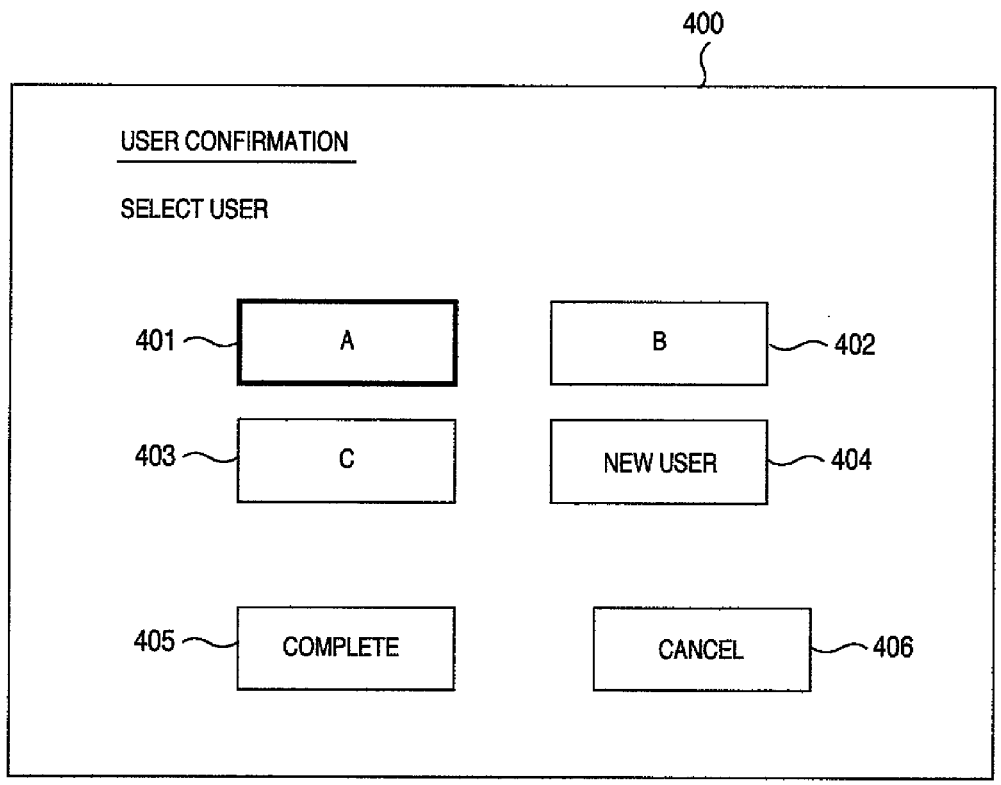

USER CONFIRMATION

SELECT USER

- 401 — A
- 402 — B
- 403 — C
- 404 — NEW USER
- 405 — COMPLETE
- 406 — CANCEL

FIG.5

| MANAGEMENT NO. | CONTENT NAME | CONTENT SUMMARY | PURCHASER | NON-DISPLAY SETTING |
|---|---|---|---|---|
| 1 | ABC CONCERT | CONDUCTOR *** | B | |
| 2 | TOURNAMENT 1 | JUNIOR 「○○○」 FIRST CARRIER | A | |
| 3 | BATTLE ON THE SUMMIT | STRONGEST WRESTLING KING | A | C |
| 4 | COOKING | FROM HOME OF GASTROLOGEN | B | |
| 5 | NEXT CASTLE | WORLD IN YEAR 2025 IS ENVISIONED | C | |
| 6 | YOU IN SPRING | LOVE MOVIE OF LEADING ACTOR MR. PON | B | A |
| 7 | KILLER CONTE | NOVEL CONTO WITH FULL BLUE JOKES | A | B,C |
| 8 | STORM TROOPS | ANIMATION **** | C | |

FIG.11

| GENRE | SUB-GENRE | DISPLAY POSSIBILITY | TARGET USER |
|---|---|---|---|
| MUSIC | CLASSIC | POSSIBLE | |
| | JAZZ | POSSIBLE | |
| SPORT | GOLF | POSSIBLE | |
| | COMBATIVE SPORT | IMPOSSIBLE | C |
| | BASEBALL | POSSIBLE | |
| | SOCCER | POSSIBLE | |
| VARIETY | | IMPOSSIBLE | B |
| ANIMATION | ・・・ | POSSIBLE | |

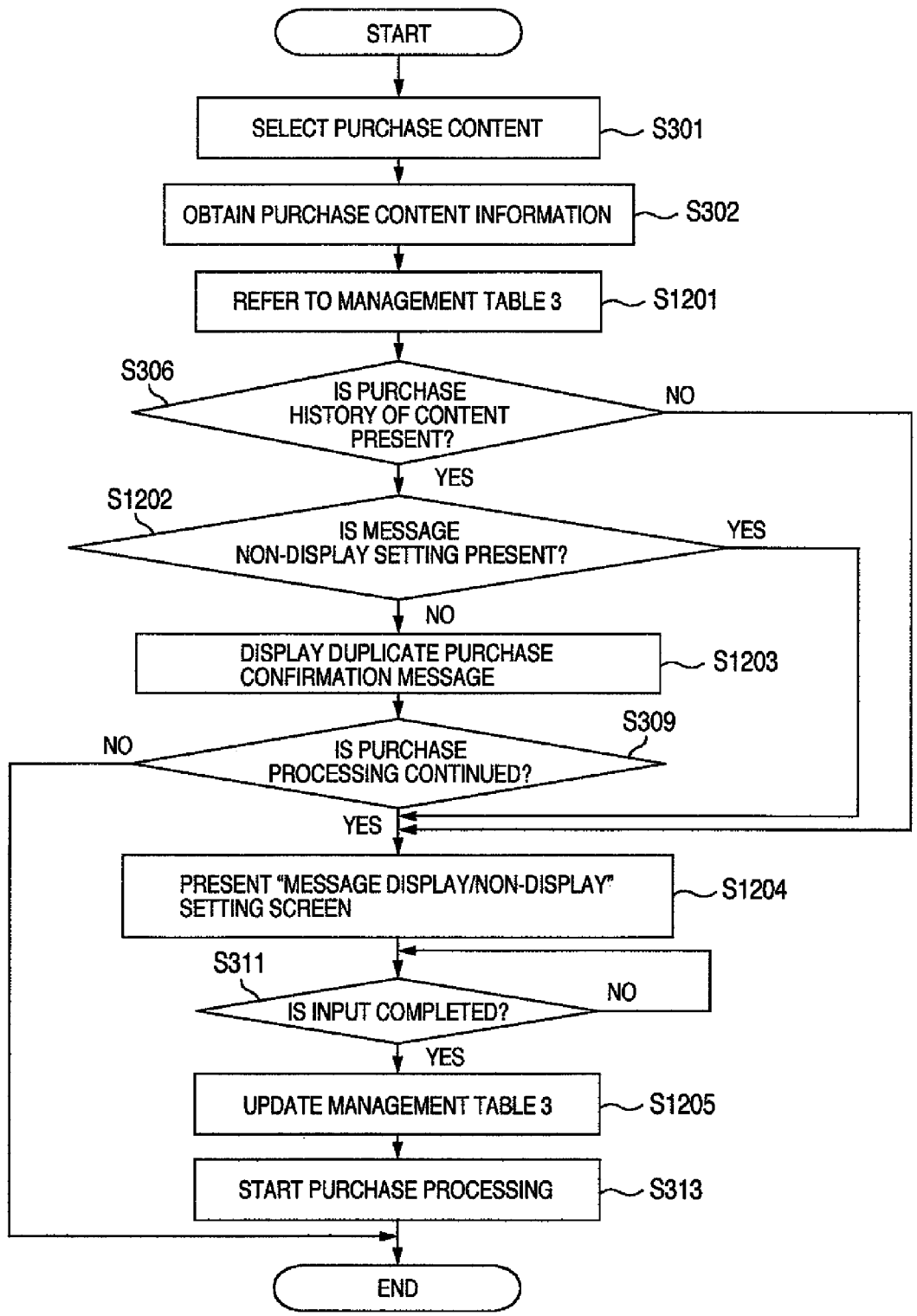

FIG.13

| MANAGEMENT NO. | CONTENT NAME | CONTENT SUMMARY | PURCHASER | NON-DISPLAY SETTING |
|---|---|---|---|---|
| 1 | ABC CONCERT | CONDUCTOR *** | | ABSENT |
| 2 | TOURNAMENT 1 | JUNIOR 「○○○」 FIRST CARRIER | | ABSENT |
| 3 | BATTLE ON THE SUMMIT | STRONGEST WRESTLING KING | — | PRESENT |
| 4 | COOKING | FROM HOME OF GASTROLOGEN | — | ABSENT |
| 5 | NEXT CASTLE | WORLD IN YEAR 2025 IS ENVISIONED | — | ABSENT |
| 6 | YOU IN SPRING | LOVE MOVIE OF LEADING ACTOR MR. PON | — | PRESENT |
| 7 | KILLER CONTE | NOVEL CONTO WITH FULL BLUE JOKES | — | ABSENT |
| 8 | STORM TROOPS | ANIMATION **** | — | ABSENT |

RECORDING AND REPRODUCING APPARATUS FOR CONTENT

INCORPORATION BY REFERENCE

The present application claims priority from Japanese application JP2009-172671 filed on Jul. 24, 2009, the content of which is hereby incorporated by reference into this application.

BACKGROUND OF THE INVENTION

The present invention relates to a recording and reproducing apparatus for content which records a content distributed through a communication medium such as a broadcast wave or network and which reproduces the recorded content. More particularly, the present invention realizes an improvement in the usability in the case where a plurality of users use the same apparatus.

By the spread of broadband lines to the home, a network environment in which large capacity content (information content) centered at videos and music is capable of being distributed to the home without stress is being equipped in recent years. Also, in parallel with the advance of a compression technology and a distribution technology of contents, the contents can be distributed to the home while maintaining its high quality.

Meanwhile, in the homes, not only in personal computers but also in home electric appliances such as a TV set and a hard disc recorder, a device with a network connection function is increasing, and also a device which obtains and uses contents distributed through the broadband line is increasing. Along with progress of a compression technology and distribution technology of the above-described contents and increase in a reproduction device connected to a network within the home, a content distribution service which distributes contents to the above-described reproduction devices and collects a usage charge (view charge) of the contents from users is realized.

A content distribution method through a network is roughly divided into two methods.

One method is a streaming system where a reproducing device obtains content data from a network and sequentially reproduces the obtained content data. The streaming system needs no data accumulation function in the reproducing device except for a unit (e.g., a buffer memory) for temporarily holding data during from the acquisition from a network up to the reproduction. Further, since a user can appoint contents and instantly start reproduction, the streaming system is characterized by the simplicity of mounting and usage.

Another method is a download system where a reproducing device collectively obtains content data from a network to accumulate the obtained content data in a data accumulation function, and reproduces the data after completion of the accumulation. The reproducing device needs a large capacity data accumulation function for maintaining the entire content, such as a hard disc drive (HDD), and has the following advantages as compared with the streaming system.

(1) High-quality contents which do not depend on quality or bandwidth of a network can be provided.
(2) Content reproduction quality is not deteriorated due to the lack of content data.
(3) A reproduction operation (trick play) within a content such as a fast-forward operation, a rewinding operation, and a cue operation is easy.
(4) Dubbing (copying) of a content to another medium is easy.

Therefore, the download system is being adopted in a content distribution service putting an emphasis on quality of the content.

In the download system, a service called a cell in which a content with no viewing period (indefinite period) is bought and can be viewed at any time is generally used in addition to a service called a so-called rental where a content with a viewing period is bought to be viewed. The user can select a service in accordance with a utilization feature of himself or herself. Incidentally, a service disclosed in "http://actvila.jp/pdf/press_20081210.pdf "A world first download distribution service of High Definition video capable of dubbing to a Blu-ray disc is started by "TSUTAYA TV on acTVila""" is one example of the download service.

By using the above-described service, the environment in which a plurality of contents are simply bought at any time to download the contents is ready also in the home. However, in this environment, a user may forget to view the purchased and downloaded content at a later date, or fail to know that another user purchases content and purchase the same content again.

In JP-A-2004-234272 (corresponding to U.S. Patent Publication No. 2005/146966), a method in which a device (client) detects a duplicate purchase to notify a user of the duplicate purchase is disclosed with respect to the above-described problem.

SUMMARY OF THE INVENTION

In JP-A-2004-234272, a method of notifying a user of a duplicate purchase is disclosed; further, the identity of a user who operates a device (client) is not objectionable in the notification.

However, a plurality of users operate the device (client) in the home in many cases. When content of a purchased content includes harmful information or information not desired to be known, the duplicate purchase is not desired to be notified to a specific user depending on the content of the purchased content in some cases.

In view of the foregoing, it is an object of the present invention to provide a recording and reproducing apparatus for content which can separate whether to notify a duplicate purchase according to content of the content and a user as a notification target and select realization of prevention against the duplicate purchase or that of filtering of the information notification.

To accomplish the above objects, according to one aspect of the present invention, there is provided a recording and reproducing apparatus for content. This recording and reproducing apparatus for content includes: an input unit which can set, for each of a plurality of contents to be purchased, whether a purchase user presents to the other users the fact that the content is already purchased; a content management unit which holds one information unit on the plurality of purchased contents and another information unit, set for each content by the input unit, illustrating whether to present the fact that the content is already purchased, and determines, based on the held information units, that when a content to be newly purchased is already purchased whether the content is a content which may be presented to be already purchased; and an output unit which presents to the other users the fact that a content to be newly purchased is already purchased when the content management unit determines that the content may be presented to be already purchased.

Further, in the recording and reproducing apparatus for content, the input unit can set a user who does not present to the other users the fact that a content to be newly purchased is already purchased; and the content management unit may further hold user information not to be presented set by the input unit and determine, based on the held information, whether the content and the user are a content and user that may be presented to be already purchased.

Further, in the recording and reproducing apparatus for content, the setting by the input unit can be performed at the time of a purchase of a content or reproduction after the purchase.

According to another aspect of the present invention, there is provided a recording and reproducing apparatus for content. This recording and reproducing apparatus for content includes: an input unit which can set, for each genre of a plurality of contents to be purchased, whether a purchase user presents to the other users the fact that the content is already purchased; a content management unit which holds one information unit on the plurality of purchased contents and another information unit, set for each genre by the input unit, illustrating whether to present the fact that the content is already purchased, and determines, based on the held information units, that when a content to be newly purchased is already purchased whether the content belongs to a genre which may be presented to be already purchased; and an output unit which presents to the other users the fact that a content to be newly purchased is already purchased when the content management unit determines that the content may be presented to be already purchased.

Further, in the recording and reproducing apparatus for content, the input unit can set a user who does not present to the other users the fact that a content to be newly purchased is already purchased; and the content management unit may further hold user information not to be presented set by the input unit and determine, based on the held information, whether the genre and the user are a genre and user that may be presented to be already purchased.

Further, in the recording and reproducing apparatus for content, the setting by the input unit can be performed before a purchase of a content or at the time of reproduction after the purchase.

According to the present invention, in the environment in which a plurality of users purchase a plurality of contents and download the plurality of contents, even if a content to be newly purchased by a user is already purchased, the recording and reproducing apparatus for content can separate whether to notify the duplicate purchase according to content of the contents and a user as a notification target.

Therefore, the content of the contents and the user as a notification target make it possible to select realization of prevention against the duplicate purchase or that of filtering of the information notification.

Other objects, features and advantages of the invention will become apparent from the following description of the embodiments of the invention taken in conjunction with the accompanying drawings.

BRIEF DESCRIPTION OF DRAWINGS

FIG. 2 is a display example of a screen for registering a user that uses the recording and reproducing apparatus for content.

FIG. 4 is a display example of a screen for confirming a user during an operation according to the first embodiment.

FIG. 5 is a content information management table for determining a duplicate purchase confirmation according to the first embodiment.

FIG. 11 is a genre information management table for determining a duplicate purchase confirmation according to the second embodiment.

FIG. 12 is a duplicate purchase confirmation setting flowchart at the time of a content purchase according to a third embodiment.

FIG. 13 is a content information management table for determining a duplicate purchase confirmation according to the third embodiment.

DESCRIPTION OF THE EMBODIMENTS

First Embodiment

One embodiment according to the present invention will be described with reference to the accompanying drawings.
<Structure of Recording and Reproducing Apparatus for Content>

First, a structure of a recording and reproducing apparatus for content according to the present invention will be described.

Figure 1:
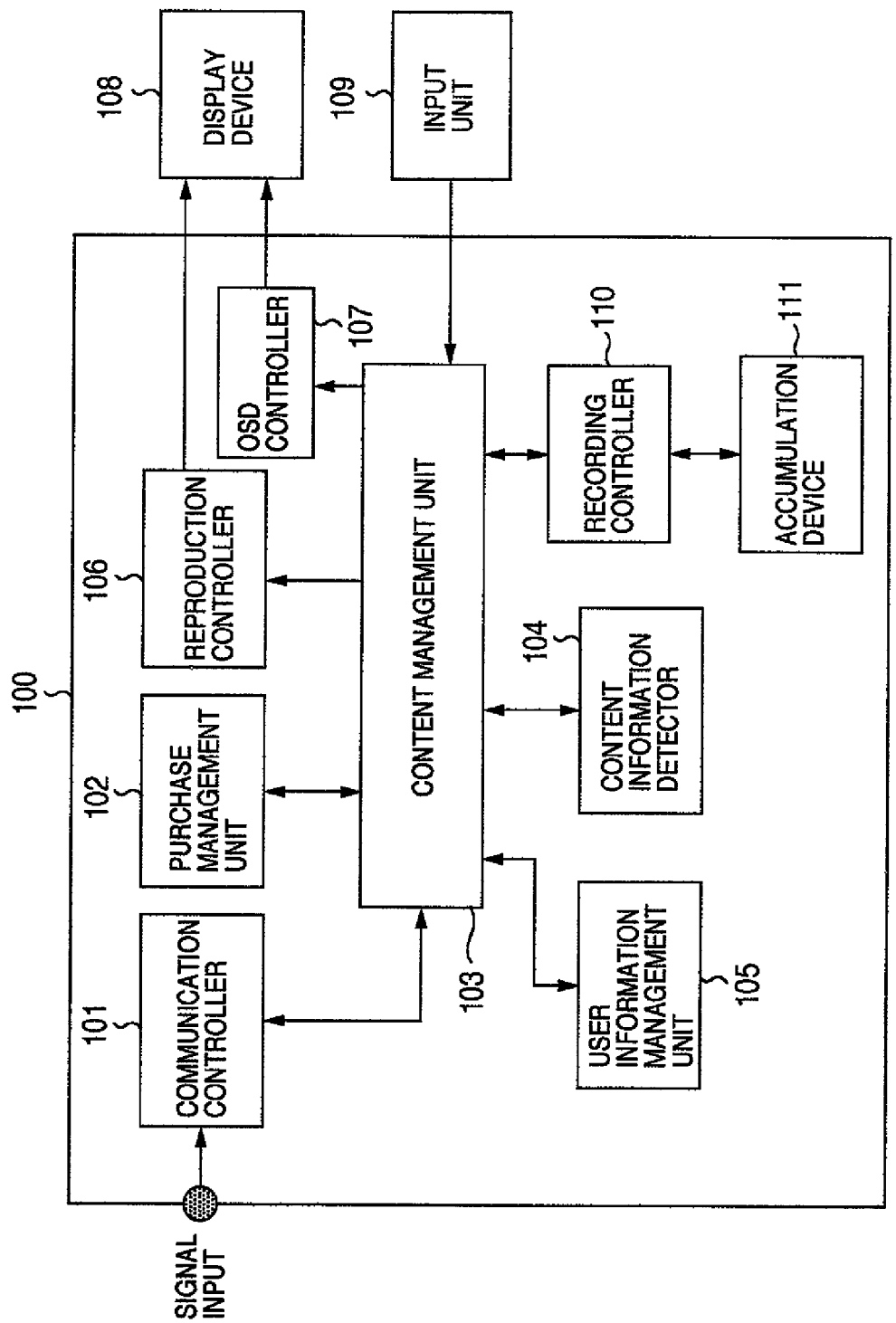
FIG. 1 is a functional block diagram of a recording and reproducing apparatus for content according to the present invention.

FIG. 1 is a functional block diagram of a recording and reproducing apparatus for content 100. The recording and reproducing apparatus for content 100 is capable of receiving contents distributed through a communication medium such as a broadcast wave or network and reproducing the received contents. Further, the recording and reproducing apparatus for content 100 is capable of recording the distributed contents in an accumulation device and reproducing the recorded contents by a user operation. Hereinafter, a function of each unit will be described with reference to the same drawing.

A communication controller 101 receives a broadcast wave content, for example, through an antenna or receives a content distributed by a content server through a network (e.g., a wide area network like an Internet). Further, the communication controller 101 receives license information showing various information units on the received content, for example, a content name, a content summary, a content genre, and a viewing limit of content. Here, various information units may be distributed by a broadcast wave, or as a shape of information inserted into a content stream. For example, the communication controller 101 may obtain the various information units from a distribution server prepared by a content distribution provider separately from the contents.

The purchase management unit 102 performs purchase management of the contents received through the communication controller 101. A purchase processing of the content is, for example, a processing in which a user purchases a pay content fixed by a content service server in order to view the content. Information on the purchased content is notified from the purchase management unit 102 to a content management unit 103. Examples of the management information include a content title, a purchase condition of content, a viewing period, and a distinction between a pay content and a free content.

The recording controller 110 associates the content received by the communication controller 101 with content information and license information to record the associated content in an accumulation device 111. When recording the content in the accumulation device 111, the recording controller 110 notifies the content management unit 103 of a title and file name of the content to be recorded and information on the viewing period described in the license.

The accumulation device 111 is provided with an accumulation medium, such as, for example, a hard disc drive, and preserves content data, content information, and control program.

The content management unit 103 manages the content information recorded in the accumulation device 111, and presents the above-described information units to the user, if necessary. In the case of newly purchasing a content, recording a content in the accumulation device, or reproducing a not-yet viewed content, the content management unit 103 updates the information units.

A content information detector 104 obtains various information units on the content, such as, for example, a content name, a content summary, and a content genre from the contents received by the communication controller 101. When the content information is transmitted through a transmission route different from that of the content, the content information detector 104 obtains the content information through the communication controller 101 and associates the separately-obtained contents and the content information units with each other.

A user information management unit 105 obtains and holds information such as a user name and a password for discriminating a user in relation to a user who uses the recording and reproducing apparatus for content.

A reproduction controller 106 instructs the recording controller 110 to read out a content and information corresponding to the content from the accumulation device 111, and outputs to a display device 108 a video obtained by decoding the read out content. Further, the reproduction controller 106 performs reproduction control at the time of reproducing a content received from a communication medium such as a broadcast wave or a network while receiving the content.

An OSD controller 107 causes the display device 108 to display a menu or message screen, a user operation screen such as a content list, and a content purchase selection screen. Further, the OSD controller 107 performs screen control processing corresponding to the input from an input unit 109 with respect to the displayed user operation screen.

In the case where detecting, in the content purchase selection screen, that the user desires to purchase a content when the user selects a specific content, the OSD controller 107 refers to information managed by the content management unit 103 and generates an attention-arousing message to the user to output the message to the display device 108, if necessary.

The display device 108 displays videos obtained by superimposing an image signal received from the OSD controller 107 on another video signal received from the reproduction controller 106.

The input device 109 is provided with a remote controller or keyboard to be communicated with the recording and reproducing apparatus for content 100 in a wireless or wired fashion, and used to select a desired operation in the user operation screen by the user.

The content management unit 103 collects information on the content purchase from the purchase management unit 102, information on the reproduction such as reproduction and stopping of the content from the reproduction controller 106, information on the content recorded in the accumulation device 111 from the recording controller 110, information on the content such as a content title from the content information detector 104, and information on the user who uses the recording and reproducing apparatus for content from the user information management unit 105, respectively, and comprehensively manages the information units on the respective contents based on the collected information units.

Further, the content management unit 103 controls the reproduction controller 106 according to a user input operation such as reproduction, stopping, or temporary stopping from the input unit 109 with respect to the content during the reproduction output to the display device 108.

This enables the content management unit 103 to confirm history and recording states of the contents purchased before at the time of the content purchase. When the content purchase is already performed, this enables the content management unit 103 to cause the display device 108 to display the duplicate purchase confirmation message on whether to perform the duplicate purchase to the operation user.

Based on the information obtained from the user information management unit 105, when confirming one user who performs the purchase operation and another user who has previously performed the purchase operation, the content management unit 103 can control information restriction and information sharing between users. When the user sets whether to perform the duplicate purchase confirmation message to the operation user, the content management unit 103 controls the output of the message according to whether to perform the duplicate purchase confirmation message.

In the present embodiment, each structure unit of the recording and reproducing apparatus for content operates in cooperation as follows.

In the recording and reproducing apparatus for content 100, the content management unit 103 obtains, when receiving a content purchase instruction from the user through the input unit 109, information on the content to be purchased from the communication controller 101 and causes the content information detector 104 to extract information such as a content name. Further, the content management unit 103 obtains history information on the content purchased before from the purchase management unit 102, and compares the obtained history information with the content information obtained by the content information detector 104. This processing enables the content management unit 103 to determine whether the content instructed to be purchased is registered as content already purchased by the user or another user. When the content is already purchased, the content management unit 103 obtains information on the user during operation from the user information management unit 105 and refers, from the accumulation device 111, to a content management table recorded as information on the previous purchaser of the content and on the possibility of confirmation at the time of the duplicate purchase. The set information on whether a message to the effect that the content is purchased in duplicate may be displayed to the user during the operation is recorded in the content management table. In addition, the user who uses the device previously performs this setting, or the purchase user performs this setting at the time of the content purchase.

When the user sets the content management table to display no message, the content management unit 103 causes the display device 108 to display no message to the effect that the content is purchased in duplicate to the user and the purchase management unit 102 to continue a purchase processing of the content. Meanwhile, when the user sets the content management table to display the message, the content management unit 103 causes the display device 108 to display, to the user through the OSD controller 107, a message to the effect that the content is purchased in duplicate.

Further, as to the content to be purchased, the content management unit 103 causes the display device 108 to display the setting screen and persuades the operation user to perform the setting by the input unit 109 so as to set whether to display the message to the effect that the content is purchased in duplicate at the time of the next content purchase.

<Registration of User Who Uses Recording and Reproducing Apparatus for Content>

First, a registration of the user who uses the recording and reproducing apparatus for content will be described. FIG. 2 illustrates one example of a registration screen for registering the user.

The registration of the user is performed to specify the user who uses the device and perform an individual processing to each user. When the recording and reproducing apparatus for content is first used or the user is registered at the time of purchasing the content, an individual processing can be provided to each user afterward.

FIG. 2 illustrates an example of registering a user name, an age, and a management password in the case of performing a user registration. When a plurality of users use the same recording and reproducing apparatus for content, a representative can be registered as a main user. When a user of minor, for example, is present, a management password of the main user is set as a main password, thereby managing minors so as to operate a purchase on his/her behalf.

<Flow of Process of Confirmation Message Display>

Figure 3:
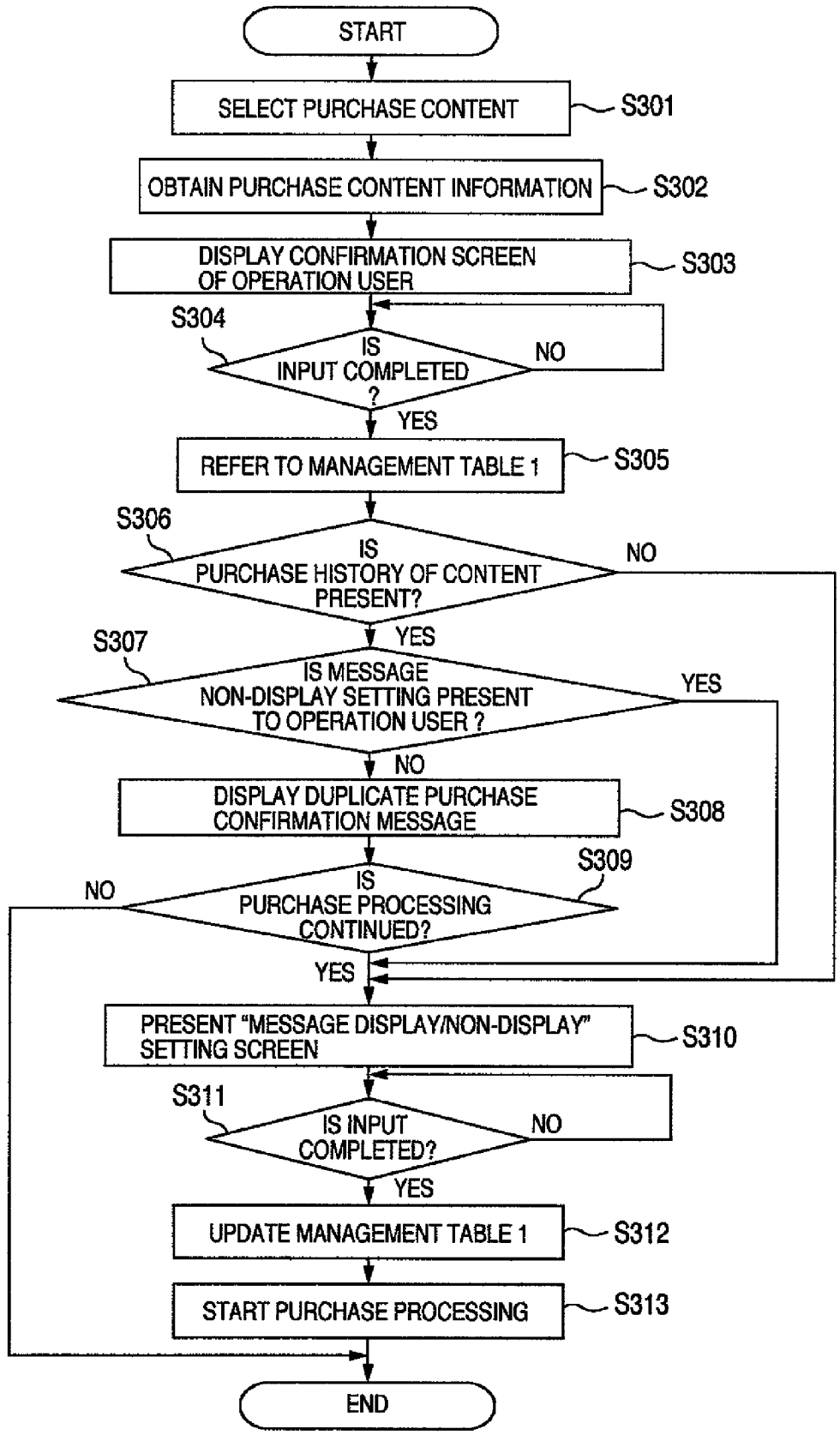
FIG. 3 is a duplicate purchase confirmation setting flowchart at the time of a content purchase according to a first embodiment.

Next, a process flow in the case where the duplicate purchase confirmation message is displayed to the user at the time of the content purchase will be described. FIG. 3 is a flowchart illustrating a process flow of the message display.

First, step S301 is a processing for purchasing a content from a content selling site provided by a service server, and a content selection screen, for example, is displayed on the display device 108. When the user selects a content desired to be purchased using the input unit 109, the content information detector 104 obtains information on the content such as a content name in step S302.

Step S303 is a processing for specifying the user who performs the purchase operation and, for example, the display device 108 displays a screen for confirming the user to specify the user.

FIG. 4 illustrates one example of a screen for confirming the user.

The user registration information previously performed in FIG. 2 is obtained from the user information management unit 105 and registered user names are displayed on a display screen 400 of FIG. 4. Here, "A", "B", and "C" are displayed as an already-registered user. In the case of an unregistered user, a new user button 404 is selected and a user registration may be performed through a screen of FIG. 2 from here. In step S304, an operation user selects his/her own name and selects a complete button 405.

Step S305 is a processing for referring to a content information management table held by the content management unit 103.

FIG. 5 illustrates one example of the content information management table. With respect to already-purchased contents, for each content, the content information management table holds a "content name", a "content summary", a "purchaser", and a "non-display setting" as a management table. These information units held by the content information management table are updated in the timing at which a content state changes, such as a content purchase, a content reproduction, and a content recording in the accumulation device. The "content name" is a title of a content. The "content summary" is a summary in which content of the content is briefly expressed, and performers and a plot, for example, are described. The "purchaser" is a user who purchases the content.

The "non-display setting" illustrates a user who is set such that the user who purchases the content prevents the duplicate purchase confirmation message from being displayed. Specifically, for example, in the " battle on the summit" of No. 3, "C" is managed as a target of the non-display and the purchase of the " battle on the summit" by "A" is notified not to "C" but to "B".

In addition, the non-display setting may be set by every user except the content purchaser. In this case, the non-display setting appropriate to each user is preferably performed by inputting a password.

Step S306 is a processing for comparing content information to be purchased obtained in step S302 and already-purchased content information obtained in step S305. By the comparison, the content management unit 103 determines whether a purchase history of the content is present, that is, the user performs a duplicate purchase. When the user performs the duplicate purchase, the process goes to step S307. In relation to the above-described content, the content management unit 103 confirms whether the user during the operation is registered as the user of the "non-display setting".

When the user during the operation is not registered as the user of the "non-display setting", the process goes to step S308. The display device 108 displays the duplicate purchase confirmation message to the user during the operation. In addition, since the same content is already purchased, by this confirmation, the content management unit 103 warns the user that the possibility that the content is not required to be newly purchased is high.

Figure 6:
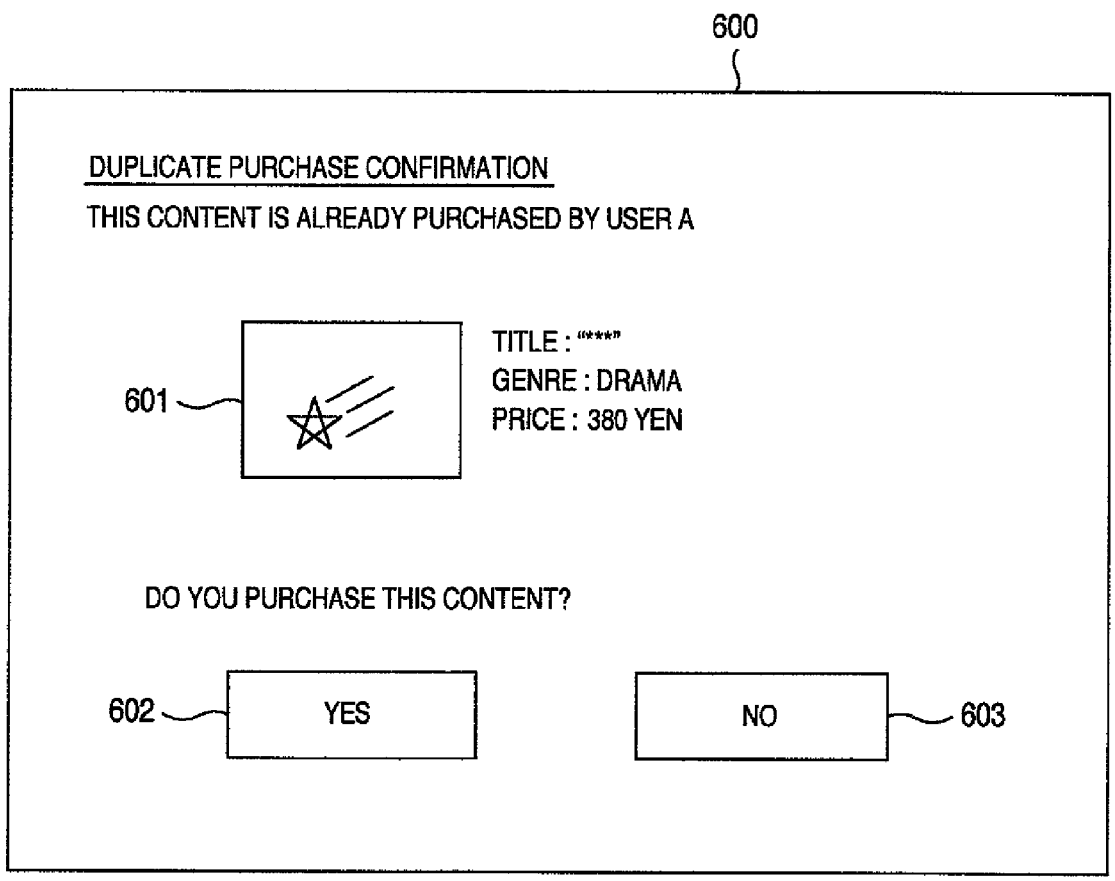
FIG. 6 is a display example of a screen for confirming whether to perform a duplicate purchase according to the first embodiment.

FIG. 6 illustrates one example of the duplicate purchase confirmation message.

The display screen 600 of FIG. 6 is a screen of the duplicate purchase confirmation message, and the display device 108 displays, for example, a thumbnail image 601, title, genre, and price on the content based on the content information obtained from the content management unit 103.

Step S309 is a processing for determining whether the user continues a purchase processing. In the duplicate purchase confirmation message screen 600, when the user selects a "purchase" button 602 by the input unit 109, the process goes to step S310 and the user continues the purchase processing. Meanwhile, in the duplicate purchase confirmation message screen 600, when selecting a "stop purchasing" button 603, the user does not perform the purchase processing and therefore, the process is terminated.

When the purchase history of the content is absent in step S306, and when the non-display setting of the message is performed with respect to the operation user in step S307, the display device 108 does not display the duplicate purchase confirmation message. The process goes to step S310 and the user continues the purchase processing.

When the user continues the purchase, step S310 is a processing for setting whether to display the duplicate purchase confirmation message in relation to the content to be purchased.

Figure 7:
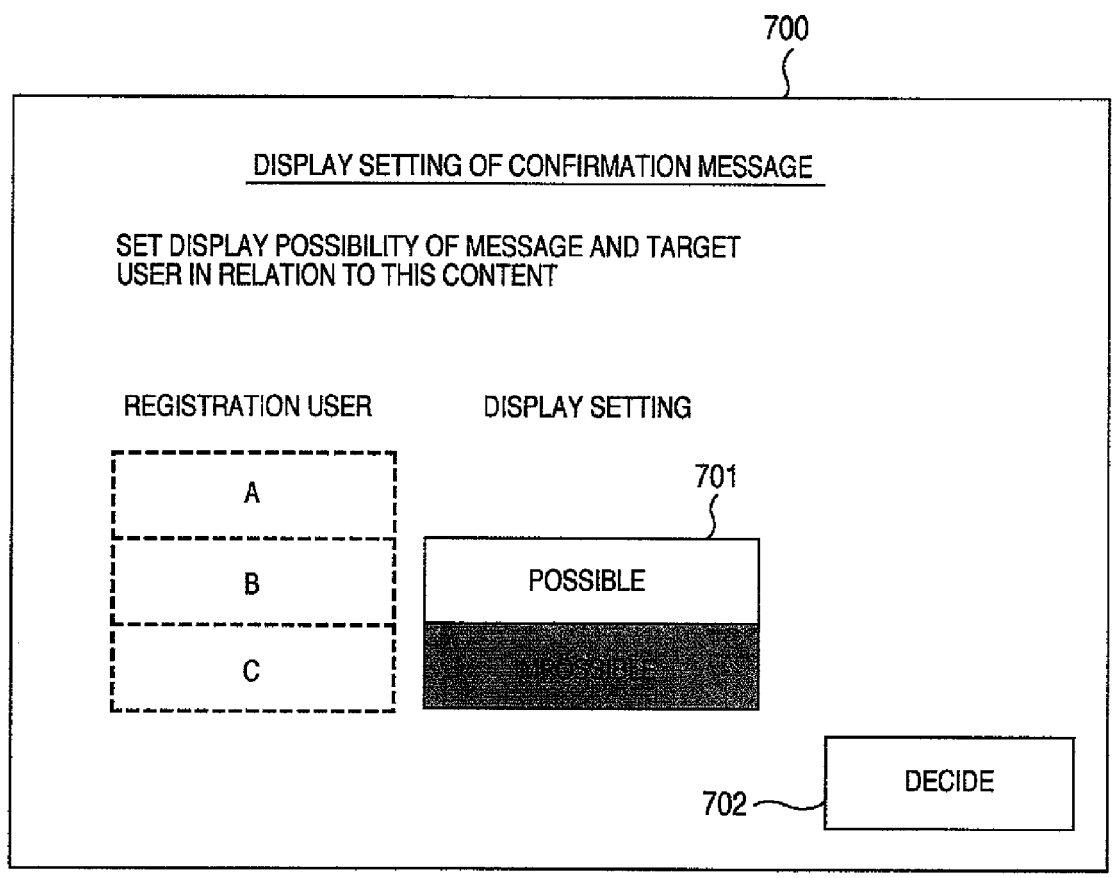
FIG. 7 is a display example of a duplicate purchase confirmation setting screen on a purchased content according to the first embodiment.

FIG. 7 illustrates one example of a setting screen on the display of the duplicate purchase confirmation message.

On the display screen 700 of FIG. 7, the user can set whether to display the duplicate purchase confirmation message to each "registration user" registered as the user of the recording and reproducing apparatus for content. In the case of FIG. 7, since the display setting is "possible" with respect to "B", when B tries to purchase the same content, the duplicate purchase confirmation message is displayed. Meanwhile, since the display setting is "impossible" with respect to "C", when C tries to purchase the same content, the duplicate purchase confirmation message is not displayed.

In FIG. 7, when the user selects a "decide" button 702, the process goes from step S311 to step S312. In step S312, the content management unit 103 registers and updates information on this purchased content in a management table as a purchased content. Thereafter, in step S313, the purchase management unit 102 starts the purchase processing of the content.

In the above-described embodiment, an example where the user manually sets whether to confirm the duplicate purchase to each content is described. Further, the recording and reproducing apparatus for content may automatically set whether to confirm the duplicate purchase to each content based on the information on the content obtained by the content management unit 103. Specifically, for example, a keyword is extracted from the content summary and the display/non-display of the duplicate purchase confirmation message is determined based on the keyword. The user may previously register a keyword in which the duplicate purchase confirmation message is set to be non-displayed or a user may contain information on the keyword in which the duplicate purchase confirmation message is set to be non-displayed in the information on the content.

As to the confirmation of the user, an input operation of the user is unnecessary and a user recognition device may be used. Examples of the user recognition device include a fingerprint authentication device, a finger vein authentication device, and a device using face recognition by a camera.

As described above, according to the first embodiment of the present invention, the proposed recording and reproducing apparatus for content can separate the display/non-display of the duplicate purchase confirmation message by detailed content of a content and a user. Therefore, the detailed content of the contents and the user make it possible to select realization of the prevention against the duplicate purchase or that of filtering of information notification.

Second Embodiment

Subsequently, a second embodiment of a method for displaying the duplicate purchase confirmation message according to the present invention will be described with reference to the accompanying drawings.

A structure of the recording and reproducing apparatus for content is the same as that of the first embodiment and therefore, the description will not be repeated.

In the first embodiment, the user sets whether to display the duplicate purchase confirmation message in units of content based on the information such as a content name. On the contrary, the second embodiment is characterized in that the user sets whether to display the duplicate purchase confirmation message in units of genre. Here, the genre means information for roughly classifying the contents based on its content, for example, information such as "movie", "music", "drama", and "news".

<Flow of Management Table Update Processing in Relation to Genre>

Figure 9:
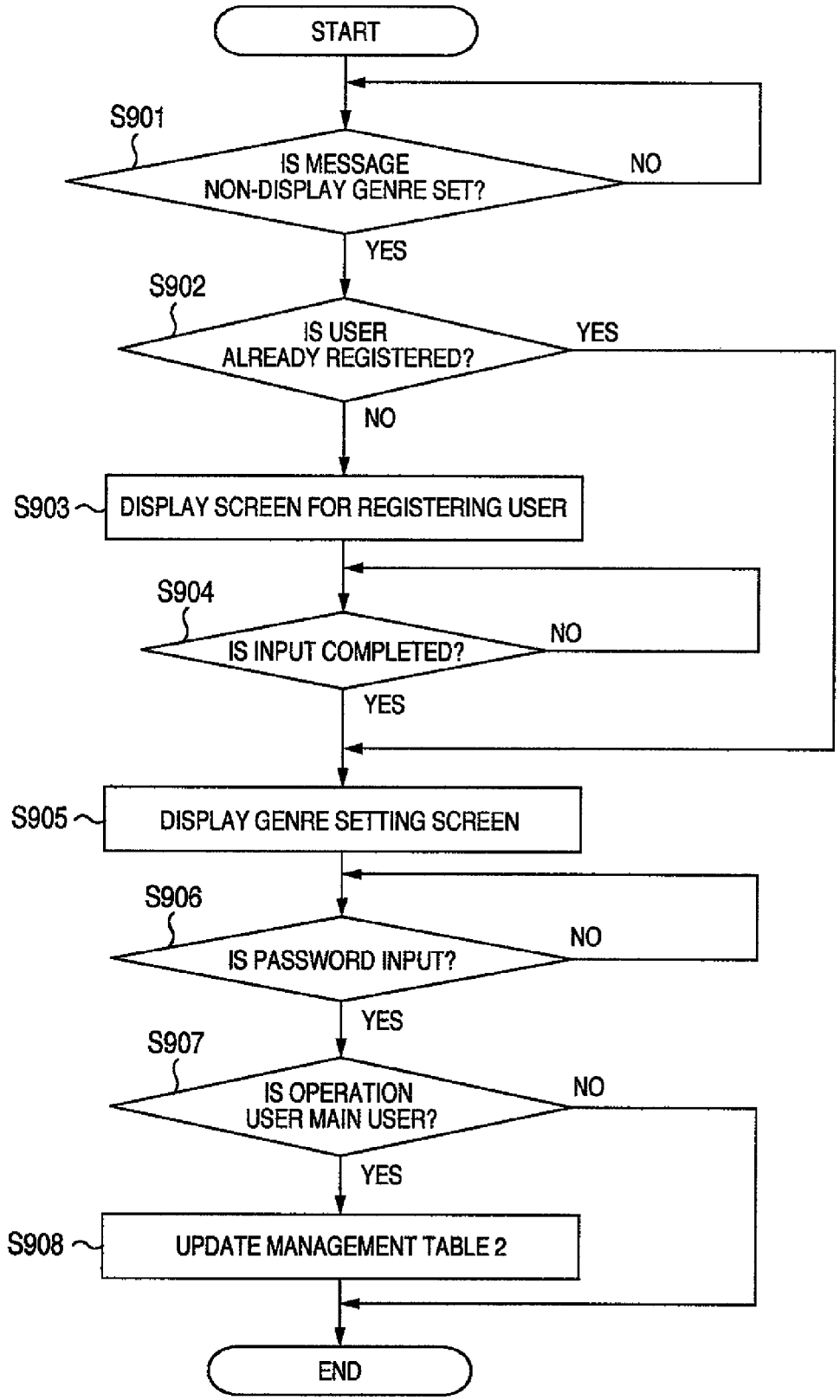
FIG. 9 is a flowchart setting non-display genre information according to the second embodiment.

FIG. 9 is a flowchart illustrating a flow of a process in which the user sets whether to display the duplicate purchase confirmation message in units of genre.

When the user desires to set the duplicate purchase confirmation message in units of genre in step S901, the content management unit 103 confirms the operation user in step S902. When performing this setting, the user may select the setting from, for example, a setting menu of the recording and reproducing apparatus for content. As in the first embodiment, the user need not perform this setting operation whenever purchasing the content, and one setting operation is fundamentally sufficient except for a setting change.

When it is determined that the user is unregistered in step S902, for example, the display device 108 displays the user registration screen of FIG. 2 in step S903 and the user performs the registration processing. When a user registration is completed in step S904, the display device 108 displays the genre setting screen for the duplicate purchase confirmation message in step S905.

Figure 10:
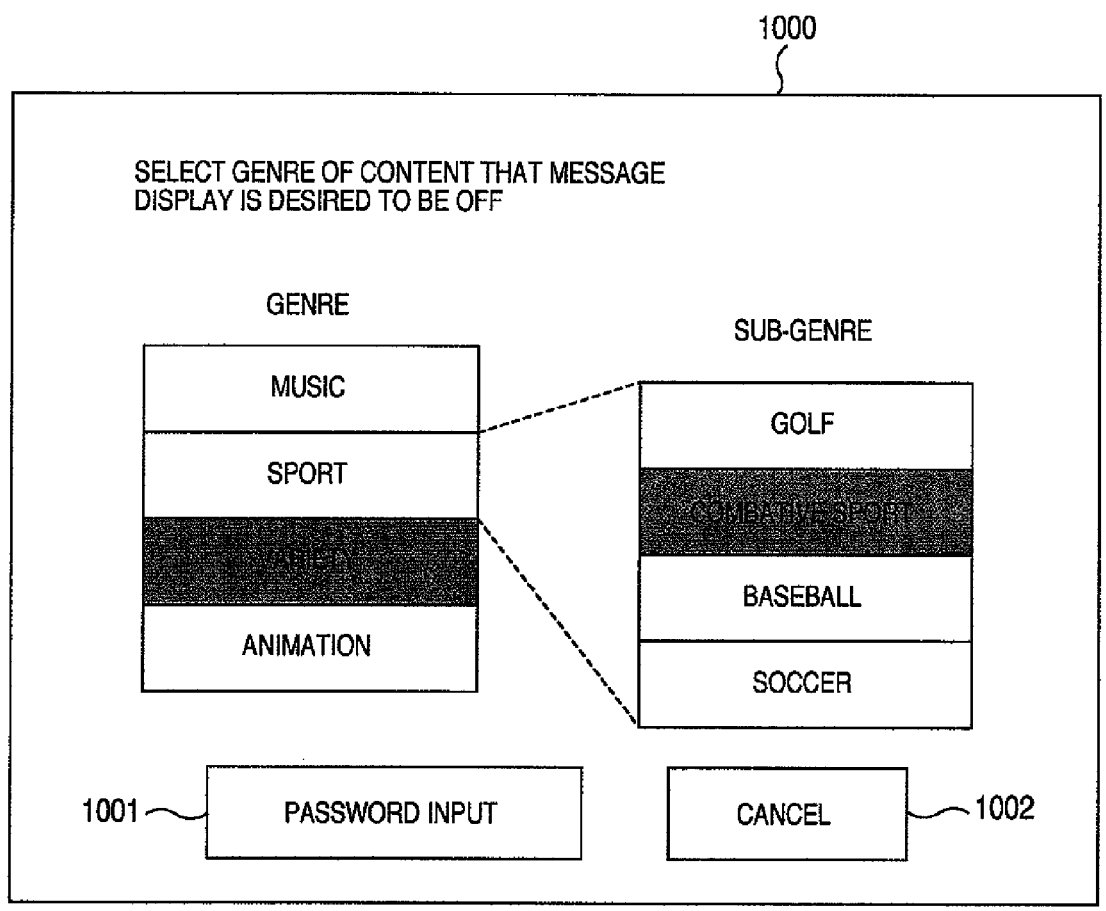
FIG. 10 is a display example of a genre setting screen in which a duplicate purchase confirmation is not performed according to the second embodiment.

FIG. 10 illustrates one example of the genre setting screen.

On the display screen 1000 of FIG. 10, the display device 108 displays, for example, the "genre" for classifying the contents and the "sub-genre" for classifying the genre in more detail. The user selects the "genre" and "sub-genre" in which the duplicate purchase confirmation message is desired to be non-displayed. FIG. 10 illustrates a state where the genre "variety" and the sub-genre "combative sport" are selected as a message non-display. When completing setting of the genre, the user performs the password input 1001 in step S906.

When the password input is completed, the content management unit 103 determines whether the operation user is a main user in step S907. The determination performed here is for confirming the operation user. The content management unit 103 compares the password input by the operation user with the user name and the information on the password previously registered in FIG. 2, and determines whether the operation user is appropriate. Specifically, when the user sets the password so as to receive only the password of the main user on the display screen 1000, only the main user can set the display/non-display of the duplicate purchase confirmation message in units of the genre.

When confirming that the operation user is the main user in step S907, the content management unit 103 performs updating and registration of the management table in relation to the genre information in step S908.

FIG. 11 illustrates one example of the management table in relation to the genre information.

The content management unit 103 manages as a table the display setting of the duplicate purchase confirmation message for the "genre" and "sub-genre" set in the display screen 1000 of FIG. 10. Here, FIG. 11 illustrates that the duplicate purchase confirmation message is not displayed with respect to the contents relevant to the genre "variety" and the sub-genre "combative sport". The target user is information for setting the display/non-display of the message for each user. When setting the target user, each user can set the display/non-display of the message. In addition, an illustration is not performed in FIG. 10; further, the user can set the target user, for example, by providing an item for inputting the target user on the display screen 1000.

<Flow of Process of Confirmation Message Display>

Figure 8:
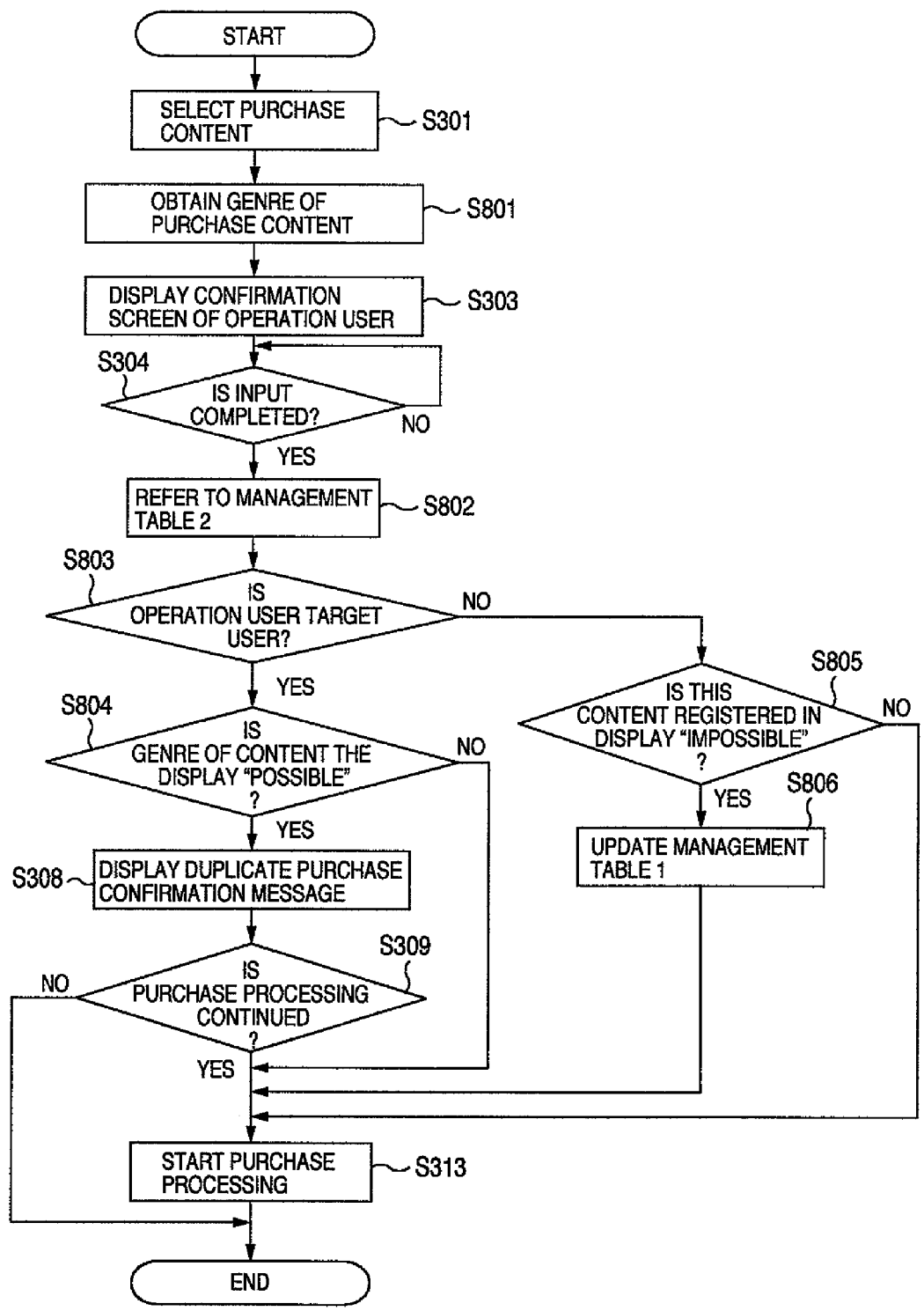
FIG. 8 is a duplicate purchase confirmation setting flowchart at the time of a content purchase according to a second embodiment.

Subsequently, a flow of a process in the case where the duplicate purchase confirmation message is displayed to the user at the time of the content purchase according to the present embodiment will be described. FIG. 8 is a flowchart illustrating a flow of a process of the message display according to the present embodiment. In this flowchart, the same processing as that of the first embodiment is indicated by the same reference numeral as in FIG. 3, and the description will not be repeated.

When selecting a content desired to be purchased in step S301, the content information detector 104 obtains a genre of the selected content in step S801.

When performing confirmation of the operation user in steps S303 and S304, the content management unit 103 refers to the management table of FIG. 11 on the genre information in step S802.

In step S803, based on the management table of FIG. 11, the content management unit 103 confirms whether the operation user is registered as the target user of the message non-display.

When the operation user is registered as the target user, the content management unit 103 further confirms whether the message display is permitted to the genre of the purchase content in step S804. If the message display is permitted, the display device 108 displays the duplicate purchase confirmation message in step S308 and then the user continues the purchase processing in step S309. For example, when the genre of the content is the "variety" and the operation user is "B", the display device 108 does not display the duplicate purchase confirmation message. Meanwhile, when the operation user is "C", the display device 108 displays the duplicate purchase confirmation message.

When the operation user is not registered as the target user in step S803, the display device 108 does not display the duplicate purchase confirmation message and the process goes to step S805.

Step S805 is a processing for registering the non-display of the duplicate purchase confirmation message to the content to be purchased. When registering the non-display, the content management unit 103 updates the content information management table in step S806.

In addition, the process may immediately go to step S313 from step S803 without performing the processings of steps S805 and S806.

In the present embodiment, other information units to obtain the same effect may be used in place of the "genre". Examples of the other information units include parental information for limiting a viewing age.

As described above, according to the second embodiment of the present invention, the recording and reproducing apparatus for content can separate the display/non-display of the duplicate purchase confirmation message from each other by the genre of the content and the user. Therefore, the genre of the content and the user make it possible to select realization of the prevention against the duplicate purchase or that of filtering of the information notification.

Further, as compared with the fact that setting is performed based on detailed content of the content as in the first embodiment, the proposed recording and reproducing apparatus for content can perform setting in a broad range of the genre and therefore, simplify the processing and the setting operation of the user.

Third Embodiment

Subsequently, a third embodiment of a method for displaying the duplicate purchase confirmation message at the time of the content purchase according to the present invention will be described with reference to the accompanying drawings.

A structure of the recording and reproducing apparatus for content is the same as that of the first embodiment and therefore, the description will not be repeated.

The first and second embodiments describe the processing on whether to display the duplicate purchase confirmation message with respect to the registration user who uses the recording and reproducing apparatus for content. Meanwhile, the present embodiment takes into consideration the case where the user registration is not performed. That is, the present embodiment selects whether to display the duplicate purchase confirmation message with respect to any users who purchase the content.

<Flow of Process of Confirmation Message Display>

A flow of a process in the case where the duplicate purchase confirmation message is displayed to the user at the time of the content purchase according to the present embodiment will be described. FIG. 12 is a flowchart illustrating a flow of a process of the message display according to the present embodiment. In this flowchart, the same processing as that of the first embodiment is indicated by the same reference numeral as in FIG. 3, and the description will not be repeated.

When selecting a content desired to be purchased in step S301, the content information detector 104 obtains information on the content in step S302.

Step S1201 is a processing for referring to the content information management table held by the content management unit 103.

FIG. 13 illustrates one example of the content information management table. The content information management table of FIG. 13 is fundamentally the same as that of FIG. 5. However, the difference from the content information management table of FIG. 5 is that the user is not registered as the "purchaser" of the information on the user.

In the "non-display setting", the user who purchases the content records information illustrating whether to display the duplicate purchase confirmation message with respect to the user who purchases the content is recorded. Accordingly, the above-described table controls whether to display the message regardless of the user.

In step S306, the content management unit 103 determines whether the purchase history of the content is present by referring to the management table. When the purchase history of the content is present, the content management unit 103 confirms the "non-display setting" by the management table of FIG. 13 in step S1202. If the non-display setting is "absent", the display device 108 displays the duplicate purchase confirmation message with respect to the user during the operation in step S1203. Meanwhile, if the non-display setting is "present", the display device 108 does not display the duplicate purchase confirmation message with respect to the user during the operation. In addition, as to the duplicate purchase confirmation message to be displayed in step S1203, the display device 108 does not display who purchases the content on a screen illustrated in FIG. 6.

When continuing the purchase processing in step S309, the user sets whether to display the duplicate purchase confirmation message on the content to be purchased in step S1204. Here, the display device 108 does not display information on the registration user on a screen illustrated in FIG. 7.

When the user completes the input operation in step S311, the content management unit 103 updates the content management table in step S1205. Specifically, on the content management table of FIG. 13, the content management unit 103 registers the "presence" or "absence" of the non-display setting in relation to the content to be purchased.

In the present embodiment, a processing in which the user is not registered with respect to the individual content as in a table of FIG. 13 is described. Further, the content management unit 103 may prevent the user from being registered with respect to the genre differently from a table of FIG. 11 according to the second embodiment.

As described above, according to the third embodiment of the present invention, the recording and reproducing apparatus for content can separate the display/non-display of the duplicate purchase confirmation message from each other based on content of the contents. Therefore, the content of the contents makes it possible to select realization of the prevention against the duplicate purchase or that of filtering of the information notification.

As in the first and second embodiments, the proposed recording and reproducing apparatus for content does not take into consideration the display/non-display of the duplicate purchase confirmation message in relation to the users, and therefore, need not perform the user registration.

Fourth Embodiment

Subsequently, a fourth embodiment on a method for setting the duplicate purchase confirmation message at the time of the content reproduction according to the present invention will be described with reference to the accompanying drawings.

A structure of the recording and reproducing apparatus for content is the same as that of the first embodiment and therefore, the description will not be repeated.

In the first embodiment, the display setting of the duplicate purchase confirmation message is performed at the time of the content purchase. Meanwhile, in the second embodiment, the display setting of the duplicate purchase confirmation message is performed before the content purchase. Specifically, the display setting is performed before viewing the content and recognizing real content. On the contrary, in the fourth embodiment, the display setting of the duplicate purchase confirmation message is performed at the time of purchasing and viewing the content or after viewing the content.

<Flow of Process of Confirmation Message Setting>

Figure 14:
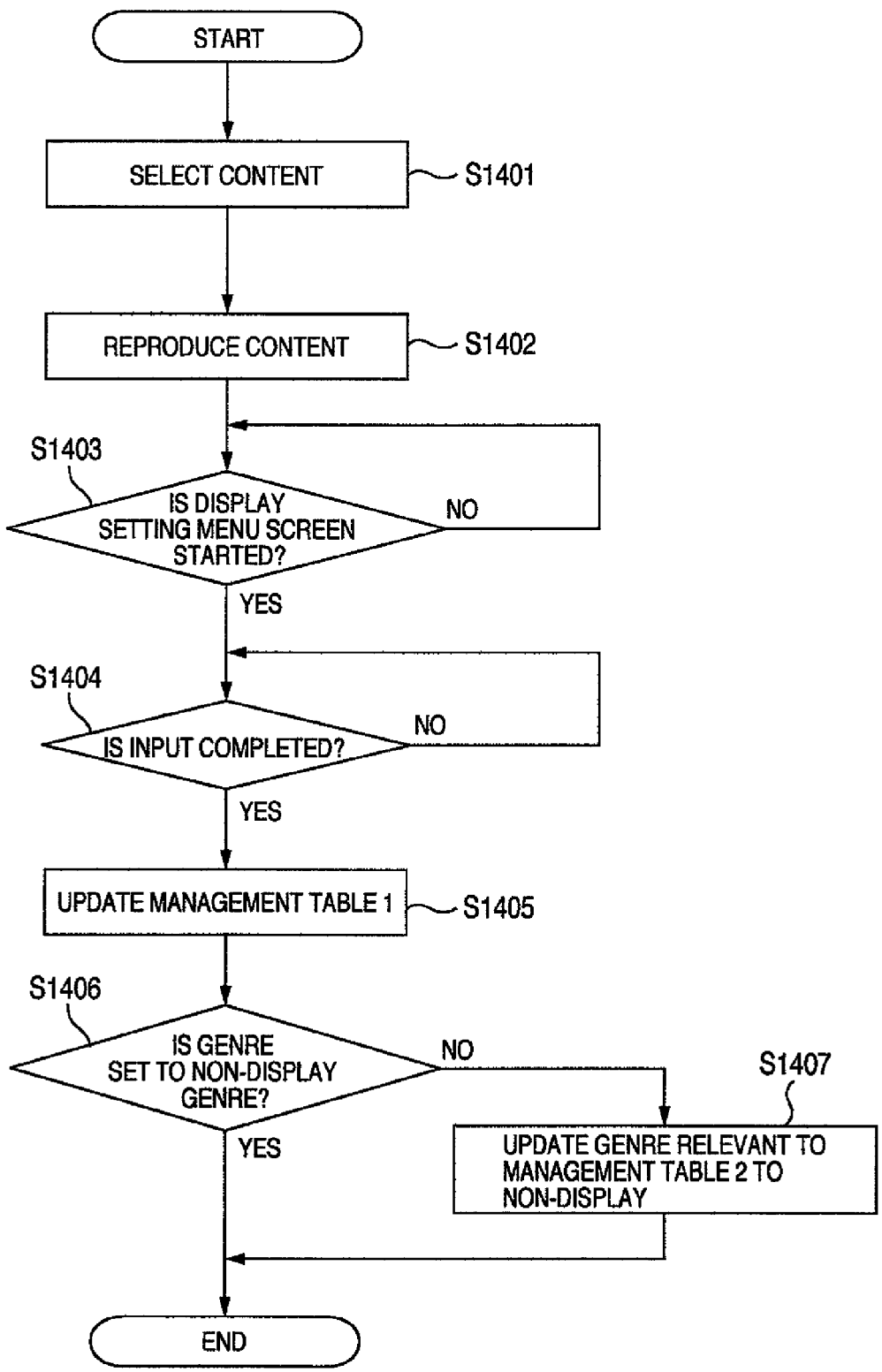
FIG. 14 is a duplicate purchase confirmation setting flowchart at the time of content reproduction according to a fourth embodiment.

A flow of a process in the case where the duplicate purchase confirmation message is set at the time of viewing the content according to the present embodiment will be described. FIG. 14 is a flowchart illustrating a process flow of setting of the duplicate purchase confirmation message according to the present embodiment.

When the user selects the content desired to be viewed in step S1401, the reproduction controller 106 starts reproduction of the selected content in step S1402.

When considering desiring to set the duplicate purchase confirmation message to be non-displayed in relation to the content during the viewing, the user starts a menu screen for setting the display by the input unit 109 in step S1403.

Figure 15:
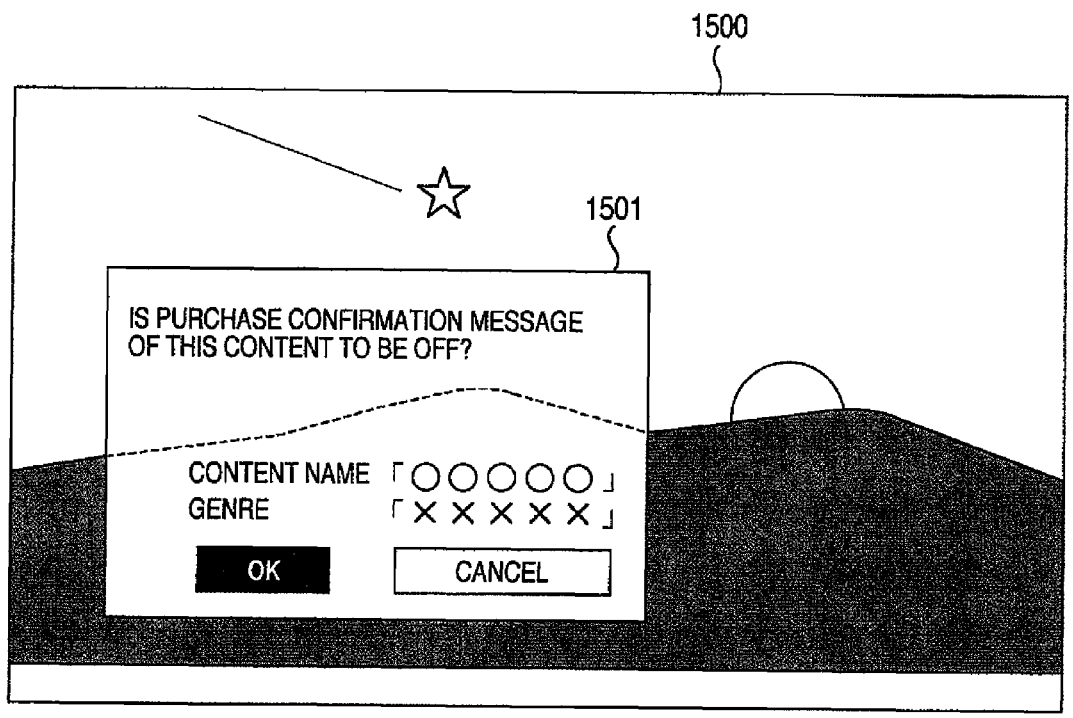
FIG. 15 is a display example of a duplicate purchase confirmation setting screen at the time of the content reproduction according to the fourth embodiment.

FIG. 15 illustrates one example of the menu screen. The display screen 1500 of FIG. 15 contains a content video during the viewing, and on this video, the display device 108 displays an OSD screen 1501 through the OSD controller 107. A content name and genre of the content during the viewing are displayed here.

In step S1404, when desiring to set the duplicate purchase confirmation message to be non-displayed with respect to the content during the viewing, the user selects an "OK" button. When desiring to set the duplicate purchase confirmation message to be displayed, the user selects a "cancel" button.

When the user completes the input, the content management unit 103 updates information on whether to non-display the duplicate purchase confirmation message in the content information management table in step S1405.

In step S1406, the content management unit 103 confirms whether the genre of the content during the viewing is already registered not to display the duplicate purchase confirmation message in the content information management table on the genre information. If the genre of the content is set as the non-display genre, the process is terminated. Meanwhile, if the genre of the content is not set as the non-display genre, the content management unit 103 updates the genre of the content during the viewing to the non-display genre in the content information management table on the genre information in step S1407.

In addition, the content management unit 103 may perform only update processing of step S1405 or step S1407. Further, in step S1407, the content management unit 103 may reconfirm to the user whether to register the genre of the content as the non-display genre.

As described above, according to the fourth embodiment of the present invention, the proposed recording and reproducing apparatus for content determines whether to display the duplicate purchase confirmation message after actually viewing content of the content and therefore, can sensitively perform the setting of the display/non-display of the duplicated purchase confirmation message based on the accurate determination of the user.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A recording and reproducing apparatus for content capable of downloading a plurality of contents distributed from the outside and recording and reproducing the plurality of contents due to a purchase by a plurality of users, comprising:
   an input unit configured to set, for each of a plurality of contents to be purchased by at least one specific other user of a plurality of other users, whether to present to the at least one specific other user a fact that the content is already purchased;
   a content management unit configured to record at least one information unit on the plurality of to be purchased contents,
   wherein the at least one information unit stores the fact, set for each content by the input unit, representing whether to present to the at least one specific other user that at least one content attempted to be newly purchased of the to be purchased content is already purchased, and
   the content management unit configured to determine, based on the at least one information unit, whether or not the at least one content attempted to be newly purchased by the at least one specific other user is a content which may be presented to the at least one specific other user that the at least one content attempted to be newly purchased is already purchased when the content attempted to be newly purchased is already purchased; and an output unit configured to present to the at least one specific other user the fact that the at least one content attempted to be newly purchased by at least one specific other user is already purchased when the content management unit determines that the fact may be presented to the at least one specific other user.

2. The recording and reproducing apparatus for content according to claim 1, wherein:

the input unit can set a user who does not present to the other users the fact that a content attempted to be newly purchased is already purchased; and the content management unit further holds user information not to be presented set by the input unit and determines, based on the held information, whether the content and the user are a content and user that may be presented to be already purchased.

3. The recording and reproducing apparatus for content according to claim 1, wherein:

the setting by the input unit is performed at the time of a purchase of a content or reproduction after the purchase.

4. A recording and reproducing apparatus for content capable of downloading a plurality of contents distributed from the outside and recording and reproducing the plurality of contents due to a purchase by a plurality of users, comprising:

an input unit configured to set, for each genre of a plurality of contents to be purchased by at least one specific other user of a plurality of other users, whether to present to the at least one specific other user a fact that the content is already purchased;

a content management unit configured to record at least one information unit on the plurality of to be purchased contents, wherein the at least one information unit stores the fact, set for each genre by the input unit, representing whether to present to the at least one specific other user that at least one content attempted to be newly purchased of the to be purchased content is already purchased, and the content management unit configured to determine, based on the at least one information unit, whether or not the at least one content attempted to be newly purchased by the at least one specific other user belongs to a genre which may be presented to the at least one specific other user that the at least one content attempted to be newly purchased is already purchased when the content attempted to be newly purchased is already purchased; and an output unit configured to present to the at least one specific other user the fact that the at least one content attempted to be newly purchased by at least one specific other user is already purchased when the content management unit determines that the fact may be presented to the at least one specific other user.

5. The recording and reproducing apparatus for content according to claim 4, wherein:

the input unit can set a user who does not present to the other users the fact that a content attempted to be newly purchased is already purchased; and the content management unit further holds user information not to be presented set by the input unit and determines, based on the held information, whether the genre and the user are a genre and user that may be presented to be already purchased.

6. The recording and reproducing apparatus for content according to claim 4, wherein:

the setting by the input unit is performed before a purchase of a content or at the time of reproduction after the purchase.

* * * * *